US011331765B1

(12) United States Patent
Sherve et al.

(10) Patent No.: US 11,331,765 B1
(45) Date of Patent: May 17, 2022

(54) METHODS OF LAPPING A SUBSTRATE WHILE HEATING AT LEAST A PORTION OF THE SUBSTRATE, AND RELATED SUBSTRATES AND SYSTEMS

(71) Applicant: Seagate Technology LLC, Cupertino, CA (US)

(72) Inventors: Andrew Sherve, Minneapolis, MN (US); Neil Zuckerman, Eden Prairie, MN (US); Vasudevan Ramaswamy, Eden Prairie, MN (US); Andrew Habermas, Bloomington, MN (US)

(73) Assignee: Seagate Technology LLC, Fremont, CA (US)

( * ) Notice: Subject to any disclaimer, the term of this patent is extended or adjusted under 35 U.S.C. 154(b) by 644 days.

(21) Appl. No.: 16/383,083

(22) Filed: Apr. 12, 2019

(51) Int. Cl.
| | |
|---|---|
| B24B 49/00 | (2012.01) |
| B24B 37/04 | (2012.01) |
| G11B 5/10 | (2006.01) |

(52) U.S. Cl.
CPC .......... B24B 37/048 (2013.01); B24B 37/042 (2013.01); *G11B 5/102* (2013.01)

(58) Field of Classification Search
CPC ...... B24B 37/048; B24B 37/042; G11B 5/102
USPC ......................................................... 451/7, 5
See application file for complete search history.

(56) References Cited

U.S. PATENT DOCUMENTS

| | | |
|---|---|---|
| 6,093,083 A | 7/2000 | Lackey |
| 6,123,608 A | 9/2000 | Nakagawa et al. |
| 6,347,983 B1 | 2/2002 | Hao et al. |
| 6,627,909 B2 | 9/2003 | Khlif |
| 6,679,762 B2 | 1/2004 | Fatula, Jr. et al. |
| 6,831,249 B2 | 12/2004 | Tam et al. |
| 6,857,937 B2 | 2/2005 | Bajorek |
| 7,086,931 B2 | 8/2006 | Oyama et al. |
| 7,362,533 B2 | 4/2008 | Stipe |
| 7,388,726 B1 | 6/2008 | McKenzie et al. |
| 7,495,856 B2 | 2/2009 | Payne et al. |
| 7,551,406 B1 | 6/2009 | Thomas et al. |
| 7,643,250 B2 | 1/2010 | Araki et al. |
| 7,911,736 B2 | 3/2011 | Bajorek |
| 8,165,709 B1 | 4/2012 | Rudy |
| 8,208,350 B1 | 6/2012 | Hu et al. |
| 8,456,969 B1 | 6/2013 | Mooney et al. |
| 8,501,536 B2 | 8/2013 | Mooney et al. |
| 8,638,349 B1 | 1/2014 | Liu et al. |
| 8,810,947 B1 | 8/2014 | Ren et al. |

(Continued)

FOREIGN PATENT DOCUMENTS

| | | |
|---|---|---|
| CN | 1274458 A | 11/2000 |
| CN | 101174417 A | 5/2008 |

(Continued)

OTHER PUBLICATIONS

Unpublished U.S. Appl. No. 15/807,249, filed Nov. 8, 2017 (no attachment).

(Continued)

*Primary Examiner* — Joseph J Hail
*Assistant Examiner* — Shantese L McDonald
(74) *Attorney, Agent, or Firm* — Kagan Binder, PLLC

(57) ABSTRACT

The present disclosure includes methods and systems that include multiple lapping stages having at least one lapping stage that laps while a heat source is applied to cause expansion during lapping and at least one subsequent lapping stage that laps while the heat source is reduced (e.g., turned off).

15 Claims, 8 Drawing Sheets

(56) References Cited

U.S. PATENT DOCUMENTS

| | | |
|---|---|---|
| 9,153,260 B1 | 10/2015 | Rudy et al. |
| 9,776,299 B2 | 10/2017 | Herendeen |
| 10,290,314 B1 | 5/2019 | O'Konski et al. |
| 10,493,591 B1 | 12/2019 | Kunkel et al. |
| 11,037,585 B2 | 6/2021 | Wessel et al. |
| 2002/0155794 A1 | 10/2002 | Fatula, Jr. et al. |
| 2003/0065992 A1 | 4/2003 | Yang |
| 2004/0075940 A1 | 4/2004 | Bajorek et al. |
| 2005/0164607 A1 | 7/2005 | Bajorek |
| 2006/0168798 A1 | 8/2006 | Naka |
| 2007/0109686 A1 | 5/2007 | Jose et al. |
| 2007/0278217 A1 | 12/2007 | Daimatsu et al. |
| 2010/0134915 A1 | 6/2010 | Sasaki et al. |
| 2010/0157477 A1 | 6/2010 | Morinaga et al. |
| 2010/0208391 A1* | 8/2010 | Gokemeijer ......... G11B 5/3166 156/64 |
| 2011/0113620 A1* | 5/2011 | Sasaki ................. G11B 5/3169 29/603.07 |
| 2014/0273764 A1 | 9/2014 | Ronshaugen et al. |
| 2015/0258655 A1 | 9/2015 | Koon et al. |
| 2015/0262596 A1* | 9/2015 | Zuckerman .......... G11B 5/1871 369/13.13 |
| 2016/0064029 A1 | 3/2016 | Zuckerman et al. |
| 2019/0381628 A1 | 12/2019 | Habermas et al. |
| 2019/0381629 A1 | 12/2019 | Rejda et al. |
| 2021/0343310 A1 | 11/2021 | Bergerud et al. |

FOREIGN PATENT DOCUMENTS

| | | |
|---|---|---|
| EP | 0362072 A2 | 4/1990 |
| WO | 0237480 A1 | 5/2002 |

OTHER PUBLICATIONS

Unpublished U.S. Appl. No. 16/380,056, filed Apr. 10, 2019 (no attachment).

* cited by examiner

METHODS OF LAPPING A SUBSTRATE WHILE HEATING AT LEAST A PORTION OF THE SUBSTRATE, AND RELATED SUBSTRATES AND SYSTEMS

BACKGROUND

The present disclosure relates to systems and methods of lapping a slider and/or row bar of sliders that can ultimately be used in a hard disc drive for read/write operations.

SUMMARY

The present disclosure includes embodiments of a method of lapping a row bar having a plurality of sliders, wherein the method comprises:

a) providing the row bar having a plurality of sliders, wherein at least one slider comprises a transducer region comprising: at least a first transducer device and a second transducer device;

b) heating the transducer region to cause at least the first transducer device and the second transducer device to expand in the lapping direction toward a lapping plate, wherein the first transducer device expands in the lapping direction toward the lapping plate by an amount greater than the second transducer device expands in the lapping direction toward the lapping plate;

c) lapping the row bar while heating the transducer region;

d) reducing the heating so that the first transducer device cools and recedes to a first receded distance in the lapping direction away from the lapping plate and the second transducer device cools and recedes to a second receded distance in the lapping direction away from the lapping plate, wherein the first transducer device recedes by an amount greater than the second transducer device; and e) lapping the row bar while the heating is reduced at least until the first transducer device is at a third receded distance in the lapping direction away from the lapping plate and the second transducer device is at a fourth receded distance in the lapping direction away from the lapping plate, wherein the fourth receded distance is less than the second receded distance.

The present disclosure also includes embodiments a method of lapping a row bar having a plurality of sliders, wherein the method comprises:

a) providing the row bar having a plurality of sliders, wherein at least one slider comprises a transducer region comprising: at least a first transducer device, a second transducer device, and one or more heat-generating devices;

b) applying a current to the one or more heat-generating devices in the transducer region to generate heat and cause at least the first transducer device and the second transducer device to expand in the lapping direction toward a lapping plate, wherein the current is controlled to cause the first transducer device to expand in the lapping direction toward the lapping plate by an amount greater than the second transducer device expands in the lapping direction toward the lapping plate;

c) lapping the row bar while applying the current to the one or more heat-generating devices;

d) reducing the current applied to the one or more heat-generating devices while lapping the row bar so that the first transducer device cools and recedes to a first receded distance in the lapping direction away from the lapping plate and the second transducer device cools and recedes to a second receded distance in the lapping direction away from the lapping plate, wherein the first transducer device recedes by an amount greater than the second transducer device; and e) lapping the row bar while the current is reduced at least until the first transducer device is at a third receded distance in the lapping direction away from the lapping plate and the second transducer device is at a fourth receded distance in the lapping direction away from the lapping plate, wherein the fourth receded distance is less than the second receded distance.

The present disclosure also includes embodiments of a lapping system comprising:

a) a mounting structure that can removably couple a row bar, wherein the row bar comprises a plurality sliders, wherein at least one slider to be lapped comprises a transducer region comprising: at least a first transducer device, a second transducer device, and one or more heat-generating devices;

b) a lapping plate having a lapping surface that is operable to rotate and contact the row bar to remove material from the row bar while the lapping plate rotates and contacts the row bar; and c) a controller comprising program instructions comprising:

i) apply a current to the one or more heat-generating devices in the transducer region to generate heat and cause at least the first transducer device and the second transducer device to expand in the lapping direction toward the lapping plate, wherein the current is controlled to cause the first transducer device to expand in the lapping direction toward the lapping plate by an amount greater than the second transducer device expands in the lapping direction toward the lapping plate;

ii) lap the row bar while applying the current to the one or more heat-generating devices;

iii) reduce the current applied to the one or more heat-generating devices so that the first transducer device cools and recedes to a first receded distance in the lapping direction away from the lapping plate and the second transducer device cools and recedes to a second receded distance in the lapping direction away from the lapping plate, wherein the first transducer device recedes by an amount greater than the second transducer device; and iv) lap the row bar while the current is reduced at least until the first transducer device is at a third receded distance in the lapping direction away from the lapping plate and the second transducer device is at a fourth receded distance in the lapping direction away from the lapping plate, wherein the fourth receded distance is less than the second receded distance; and d) a source of electrical current, where the source is electrically coupled to the row bar and the controller.

DETAILED DESCRIPTION

Figure 1A:
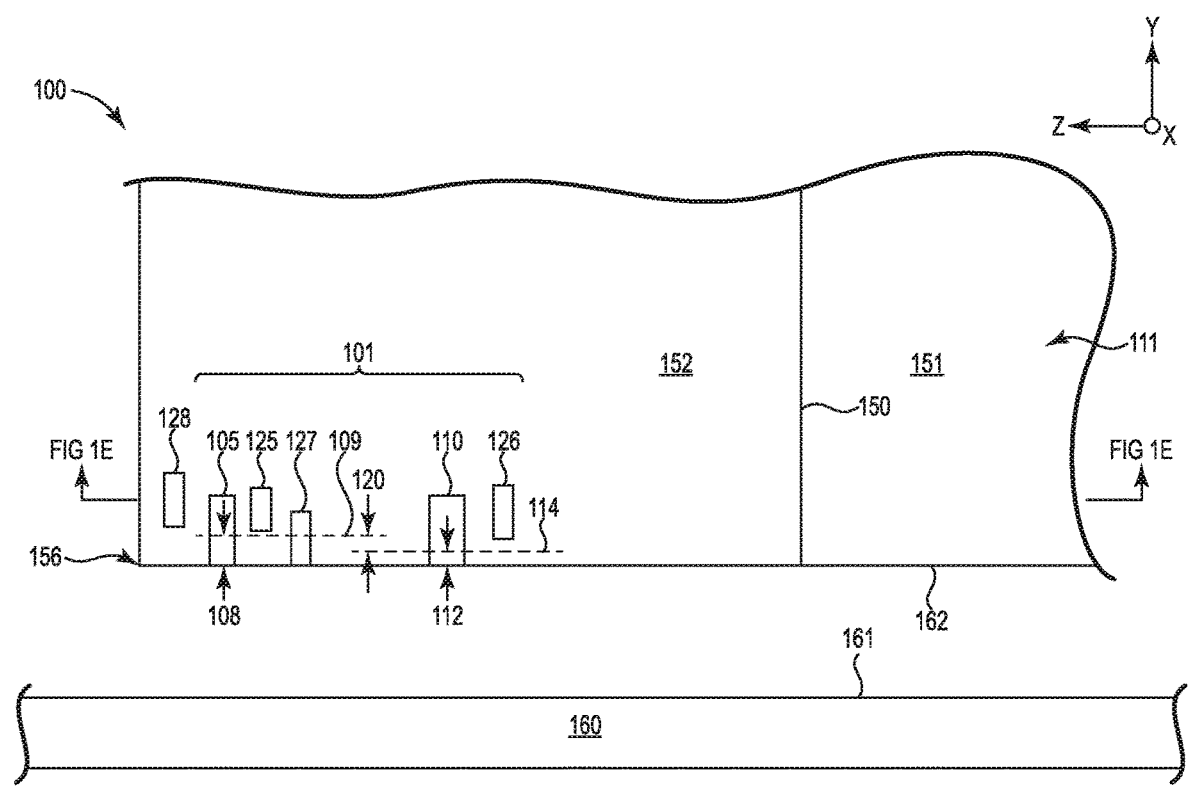
FIG. 1A shows a schematic, cross-section view of a portion of a slider in a row bar that can be lapped according to the present disclosure.

A magnetic recording apparatus can be referred to as a hard disk drive (HDD) and includes a slider that flies above a disk by using air as a lubricant (an "air bearing"). For example, a disk can be placed on a spindle motor that can rotate and a negative pressure air-lubricated bearing slider can be moved by an actuator that pivots so that the slider moves to a desired position on a track of the disk. The disk used as a recording medium has a circular shape and different information can be recorded on each track. In general, to obtain desired information, the slider moves in search of a corresponding track on the disk. The disk can have a magnetic layer that is susceptible to physical and/or chemical damage. To help mitigate such damage, such a disc often has a coating such as Diamond-like Carbon (DLC) as an overcoat to help protect the magnetic layer from physically and/or chemically induced damage.

A lapping tool is used for machining a surface of a row bar that can be later sliced into a plurality of individual sliders. The lapping tool can have a rotating lapping plate defining a lapping surface which can help abrade the surface of a slider. If desired, a slurry can be applied to the lapping surface to enhance the abrading action as the lapping surface is rotated relative to a row bar containing a plurality of the sliders held in a pressing engagement against the lapping surface. Lapping a row bar of sliders permits multiple slider bodies to be processed together, which can advantageously be relatively simple, precise and/or cost-effective. Lapping can involve multiple lapping steps such as rough lapping and final (kiss) lapping. At a desired point in manufacturing, individual sliders can be sliced from the row bar and ultimately used in a hard disk drive.

Rough Lapping can be considered a relatively coarse lapping procedure used to remove relatively more material as compared to kiss lapping. For example, rough lapping can remove up to 10 micrometers of material from a row bar in the lapping direction, or even up to 20 micrometers of material from a row bar in the lapping direction. A row bar can be tilted at a specific position relative to the lapping plate to target a particular device (e.g., reader or writer).

Kiss Lapping can be considered a fine lapping procedure and can be used to remove fractions of material from a row bar as compared to rough lapping. For example, kiss lapping can remove 0.5 microns or less, or even 0.1 microns or less of material from a row bar in the lapping direction.

After rough lapping, but before kiss lapping, two or more electronic features of corresponding transducer devices in the transducer region of a given slider may be at different distances from their target values in the lapping direction. For example, before kiss lapping, an electromagnetic writer device (also referred to as a "writer") may be at a different distance from its target value as compared to a magnetoresistive reader device (also referred to as a "reader"), thereby creating a delta distance (also referred to as a reader/writer delta). Lapping to each target value of a writer and reader during kiss lapping can be difficult when a reader/writer delta is present, especially considering that there are a plurality of sliders in a row bar.

A heat source can be used to expand a transducer device (e.g., a writer) in the transducer region of a given slider so that the expanded portion can be removed. For example, a writer device could be expanded a desired amount in the lapping direction so that the expanded portion could be removed via lapping. Unfortunately, a given heat source (e.g., the writer device itself and/or one or more resistive heaters) can cause one or more surrounding devices (e.g., a reader) to also expand unintentionally in the lapping direction while the writer device is lapped in a heated, expanded state. This unintended expansion of one or more surrounding devices can be referred to as a "penalty". For example, lapping while heating can unintentionally cause material to also be removed from a reader. When heating and lapping are stopped, the reader device and the writer device both recede relative to the air bearing surface. It can be desirable to not have devices such as the reader device recede when lapping is complete because in drive operation the reader device may have to be heated during read operations so that the reader device is sufficiently close to the underlying disk media. Because reader devices can be relatively sensitive to heat it can be desirable to avoid undue exposure of reader devices to heat during read operations.

The present disclosure provides methods and systems that can mitigate such penalties of unintended device expansion due to heating while lapping by including a multi-stage lapping process that includes lapping a given slider at different temperatures at one or more stages of lapping. For example, a slider can be heated during a first stage of kiss lapping to cause desired transducer device expansion while lapping, followed by a second (final) stage of kiss lapping with no heating.

In more detail, for illustration purposes, a nonlimiting example according to the present disclosure is described with respect to FIGS. 1A-1H where a first transducer device is a electromagnetic writer device (writer) and a second transducer device is a magnetoresistive reader device (reader). The slider in FIG. 1A represents a slider 111 that has been through rough lapping. FIGS. 1D-1H represent various points (stages) in a kiss lapping process.

As used herein, the direction along x-axis (into the page of FIG. 1A) is referred to as the cross-track axis. The direction along the z-axis is referred to herein as the down-track axis, with reference to trailing edge 156. The direction along the y-axis is referred herein as the lapping direction (direction of material removal) or the reader stripe height direction and writer break-point direction.

The present disclosure can be applied to a variety of slider heads such as perpendicular magnetoresistive (PMR) heads, head-assisted magnetoresistive (HAMR) heads, and the like. In some embodiments, the present disclosure can be useful with respect to PMR heads because areal density of PMR heads is affected by the accuracy of the write pole width, and write pole width accuracy can be increasingly challenging as the write pole width is reduced and the flare angle is increased. In other embodiments, the present disclosure can be useful with respect to HAMR heads because the areal density and reliability can be affected by the break point control for the near-field transducer.

As shown in FIG. 1A, one slider 111 of a plurality of sliders in row bar 100 is illustrated. Slider 111 includes a transducer region 101 having at least a first transducer device and a second transducer device. For illustration purposes, first transducer device is an electromagnetic writer device 105, and second transducer device is a magnetoresistive reader device 110.

In some embodiments, a row bar according to the present disclosure can include at least 30 sliders, at least 60 sliders, or even at least 70 sliders. A slider according to the present disclosure can be mostly made out of ceramic material. As shown in FIG. 1A slider 111 includes an "AlTiC break" 150. The area 151 to the right of break 150, the bulk of the material is alumina titanium-carbide (also referred to as AlTiC). The area 152 to the left of break 150, the bulk of the material, with the exception of many of the features in the transducer region 101, is alumina. Devices such as electromagnetic writer device 105 are made of magnetic materials such cobalt-iron (CoFe), nickel-iron (NiFe), and the like.

Figure 1B:
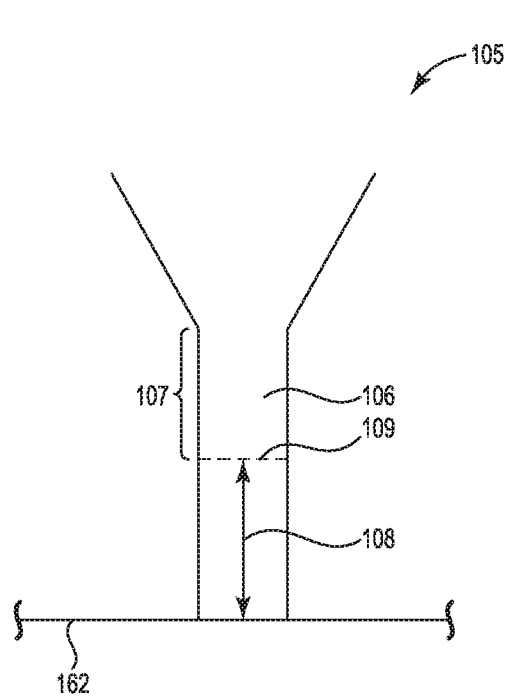
FIG. 1B shows a schematic, cross-section view of a portion of the electromagnetic writer device 105 shown in FIG. 1A.

As shown in FIG. 1B, the electromagnetic writer device 105 has a write pole 106 as a first feature that has a first target distance 108 between a first slider planar, reference lapping plane 162 and a first target value 109 in the lapping direction "y". The writer break point distance 107 coincides with the writer break point target position 109 after material is removed in the lapping direction by an amount represented by first distance 108.

Figure 1C:
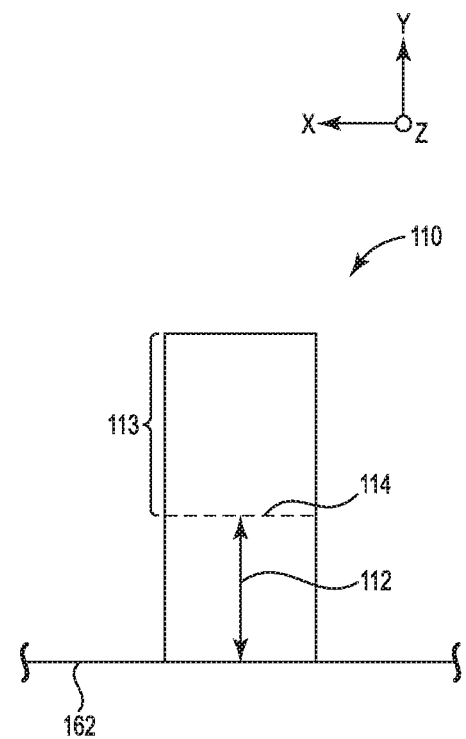
FIG. 1C shows a schematic, cross-section view of a portion of the magnetoresistive reader device 110 shown in FIG. 1A.

As shown in FIG. 1C, the magnetoresistive reader device 110 has a reader stripe height 113 as a second feature that has a second distance 112 between the first slider planar, reference lapping plane 162 and a second target value 114 in the lapping direction "y". The reader stripe height 113 coincides with the reader stripe height target position 114 after material is removed in the lapping direction by an amount represented by second distance 112.

Referring back FIG. 1A, as can be seen, there is a difference (delta) 120 between first distance 108 and second distance 112. That is, the distance 108 of the electromagnetic writer device 105 from its writer break point target position 109 to reference plane 162 is different than the distance 112 of the magnetoresistive reader device 110 from its reader stripe height target position 114 to reference plane 162. As shown in FIG. 1A, the first target distance 108 is greater than the second target distance 112, thereby creating delta distance 120.

In some embodiments, the delta distance 120 is 50 nanometers or less. For example, delta distance 120 can be in the range from 0.1 nanometers to 40 nanometers, from 0.5 nanometers to 40 nanometers, or from 0.1 nanometers to 10 nanometers.

As mentioned above, a heat source in the transducer region of a slider can be used to selectively expand an electronic feature (e.g., a writer) relative to another feature (e.g., a reader) within a given slider so that the expanded portion can be removed (further discussed below).

Figure 1D:
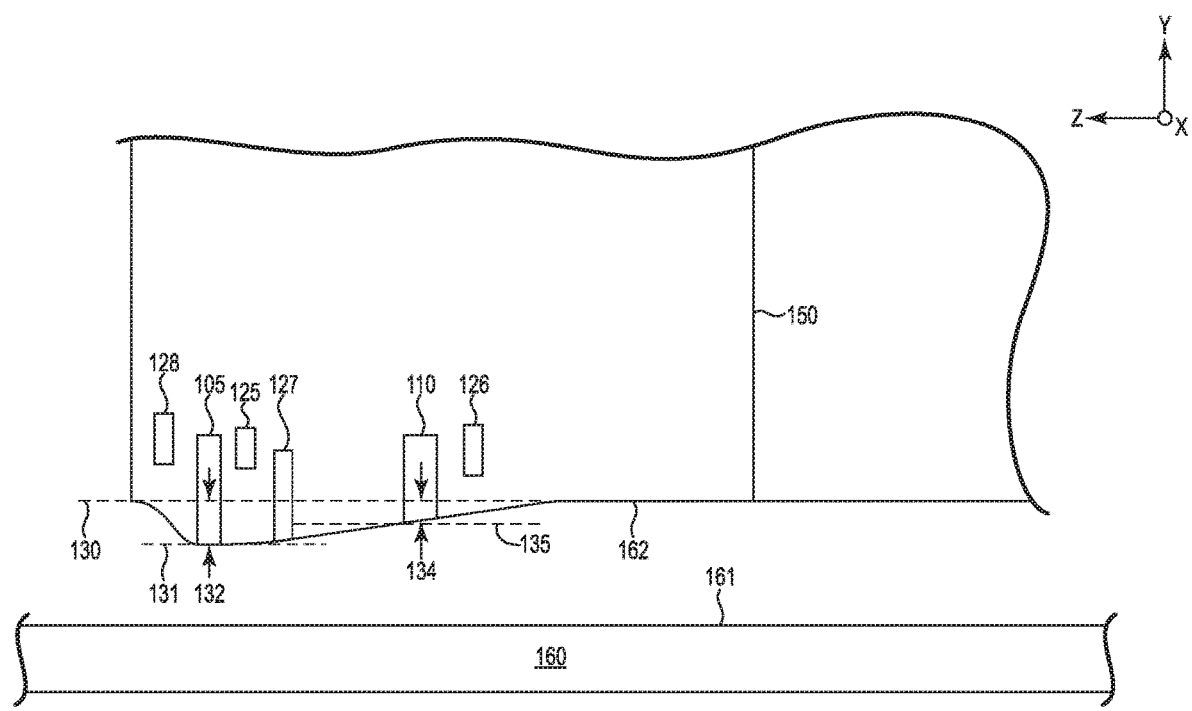
FIG. 1D shows a schematic, cross-section view of the portion of the slider shown in FIG. 1A when the writer electrical resistive heater 125 is energized.

Heat can be generated from a variety of heat sources. In some embodiments, one or more electrical devices in the transducer region can be chosen to generate heat and cause expansion during lapping as described herein. Nonlimiting examples of electrical devices within a transducer region that can be used to heat and expand a writer device during lapping include one or more of an electrical resistive heater, writer coils of an electromagnetic writer device, a magnetoresistive reader device, an electromagnetic writer device, a laser/near field transducer (on-wafer laser), a dual-ended temperature coefficient of resistance sensor (DETCR), or a thermal asperity detector (TAD). As shown in FIG. 1D, one or more heat-generating devices that could be used to heat and expand electromagnetic writer device 105 during lapping include the writer coils of electromagnetic writer device 105, electrical resistive heater 125, or electrical resistive heater 128. In addition to or as an alternative to heating, one or more other forms of actuation can be used to cause a transducer device (e.g., writer device) to move in the lapping direction relative to the air bearing surface plane. Nonlimiting examples of such other forms of actuation include magnetostriction (applying a magnetic field to force a dimensional change) and/or using a piezoelectric actuator (applying an electric field to force a dimensional change).

As shown in FIG. 1A, examples of electrical resistive heaters include one or more of writer electrical resistive heater 125, reader electrical resistive heater 126, or optional electrical resistive heating device 128.

As shown in FIG. 1A, writer electrical resistive heater 125 is located proximal to electromagnetic writer device 105 and reader electrical resistive heater 126 is located proximal to magnetoresistive reader device 110. Writer electrical resistive heater 125 and/or reader electrical resistive heater 126 are examples of electrical resistive heaters that can be used during lapping according to the present disclosure and during operation of a hard disc drive to adjust the distance between the writer and/or reader, respectively, and an underlying rotating disc during read/write operations.

In more detail with respect to lapping while heater 125 is turned on, as shown in FIG. 1D, if current is applied to writer electrical resistive heater 125 so that it is energized and generates heat, the heat can cause the electromagnetic writer device 105 to expand a first distance in the "y" direction toward the lapping plate 160 by a first expanded distance 132 from a first slider planar, reference lapping planes 130 to plane 131 (it is noted that reference plane 130 is coplanar with air bearing surface 162). The first expanded distance 132 is equal to the first target distance 108 in FIG. 1B, which corresponds to slider material that can be removed via lapping (see FIG. 1F).

Unfortunately, heat sources such as writer electrical resistive heater 125 can cause one or more surrounding devices in the transducer region 101 to unintentionally expand in the "y" direction toward the lapping plate 160. The expanded portions of such surrounding devices may also be removed during lapping while the heat source is on and device 105 is lapped. When the heat source is turned off, the surrounding devices that had material removed via lapping can recede with respect to the air bearing surface 162 (see FIG. 1G). Having a device unintentionally recede with respect to air bearing surface in a finished product when lapping is complete can be undesirable, for example, with respect to magnetoresistive reader device 110 because the magnetoresistive reader device 110 may have to be heated during disc drive operation so that the magnetoresistive reader device 110 is sufficiently close to an underlying disc. But, a magnetoresistive reader device 110 can be sensitive to undue exposure to heat so it may be desirable to avoid or at least mitigate the undue exposure of heat with respect to magnetoresistive reader device 110, especially during disc drive operation.

According to the present disclosure, one or more heat sources are selected to provide a pre-determined (controlled) expansion of one or more devices during a first stage of lapping while the heat sources are activated (energized). After the first stage of lapping, the one or more heat sources are adjusted (e.g., reduced or turned off) so that the one or more transducer devices recede with respect to the air bearing surface during a final stage of lapping so that the air bearing surface can be planarized to be coplanar with, e.g., reader stripe height target position 114 of magnetoresistive reader device 110. This way, 114 does not recede with respect to air bearing surface 162 after lapping is complete. This solution according to the present disclosure will be described in more detail below with respect to the illustrative example of a two-stage (heater on followed by heater off) kiss lapping process in FIGS. 1D-1H.

Figure 1E:
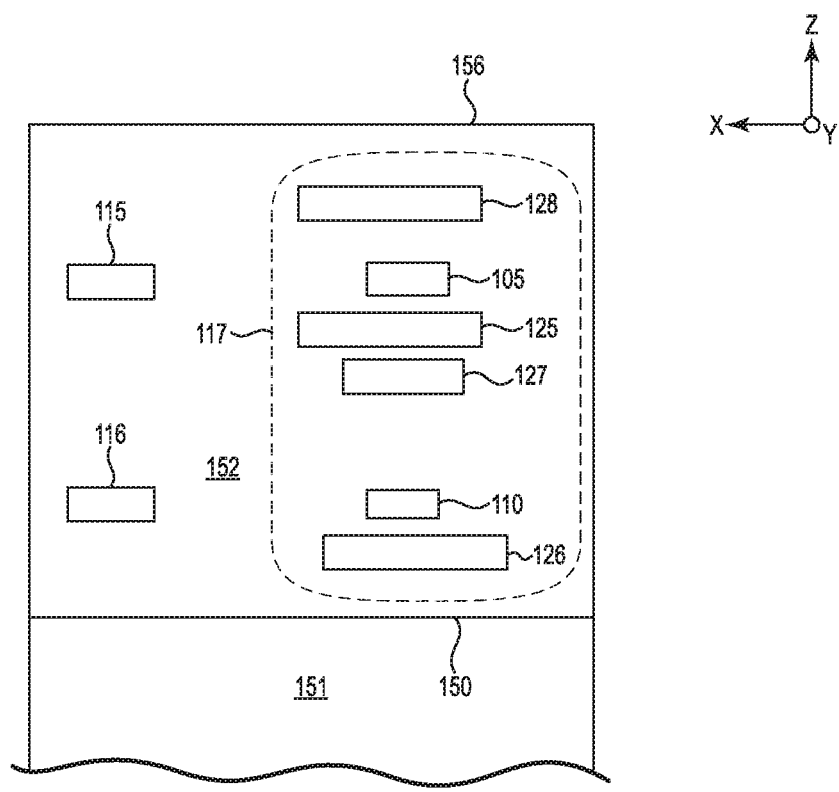
FIG. 1E shows a schematic, bottom view of the portion of the slider shown in FIG. 1D.

Referring to FIGS. 1D and 1E, an amount of current is applied to heater 125 to cause the area 117 to expand in the lapping direction "y" toward lapping plate 160.

A heat source such as heater 125 can be selected to provide a desired and predetermined expansion in area 117. A variety of factors can influence the expansion that occurs in area such as area 117. For example, the power supplied to electrical resistive heater 125, the coefficient of thermal expansion of the bulk material in area 117 (e.g., alumina), the coefficient of thermal expansion of the devices (e.g., writer 105 and reader 110) in area 117, the proximity of the one or more heat sources to devices such as writer 105 and reader 110, and the like.

In some embodiments, a heater that produces a predetermined expansion can be selected using thermal/mechanical modeling. For example, correlating temperature to protrusion of electromagnetic writer device 105 and magnetoresistive reader device 110 can include a model for temperature vs protrusion of the writer and reader. Commercially available software packages are available like COMSOL Multiphysics® software that can be used to model the protrusion profiles of a writer and reader while an electrical heater is used at different power settings. Empirical modeling can be performed by electrically connecting to a heater, lapping bars under a range of heater currents/powers, and then measuring the height profiles for a reader and a writer protrusion using either an atomic force microscope or with an optical profilometer.

Referring to FIG. 1D, when the writer electrical resistive heater 125 is energized to generate heat, the electrical current can be controlled to cause the magnetoresistive reader device 110 to expand a predetermined distance in the "y" direction toward the lapping plate 160 by a second expanded distance 134 from the first slider planar, reference lapping plane 130 to plane 135. The second expanded distance 134 is equal to the second target distance 112 in FIG. 1B, which corresponds to slider material that can be removed via lapping (see FIG. 1F). The first expanded distance 132 is greater than the second expanded distance 134, therefore the ratio of the first expanded distance 132 to the second expanded distance 134 is greater than one. As mentioned, one or more heat sources (e.g., electrical resistive heaters 125, 126, and 128) can be selected to produce a desired ratio of first expanded distance 132 to the second expanded distance 134 for a given power that is supplied to the one or more heat sources. In some embodiments, the writer electrical resistive heater 125 can be controlled so that the difference between the first expanded distance 132 and the second expanded distance 134 is equal to the delta distance 120 described with respect to FIG. 1A.

In addition to the power that is supplied to a heater, the ratio of first expanded distance 132 to the second expanded distance 134 can also depend on the location of the writer electrical resistive heater 125 in the downtrack "z" direction. In some embodiments it can be desirable to locate an electrical resistive heater (e.g., 125) proximal to its primary intended transducer device (e.g., 105) so that the ratio is relatively high. For example, so that writer electrical resistive heater 125 causes little to no expansion of the magnetoresistive reader device 110 in the "y" direction. In some embodiments, an electrical resistive heater (e.g., writer electrical resistive heater 125) is proximally located to its primary intended transducer device (e.g., electromagnetic writer device 105) so that the heater is from 0.5 to 5 micrometers in the downtrack direction from the transducer device. In some embodiments, energizing an on-wafer-laser can be a desirable device to energize during lapping because it can relatively localize the heat that is generated thereby producing a relatively high and desirable ratio of first expanded distance 132 to the second expanded distance 134.

In some embodiments, an electrical resistive heater can be located above the air bearing surface in the lapping direction "y" by a distance in the range from 1 to 10 micrometers.

Referring back to FIG. 1A, in some embodiments one or more optional electrical resistive heaters can be included that are dedicated to lapping operations. The one or more optional electrical resistive heaters can be located proximal to the feature that they are intended to selectively expand in the lapping direction during at least lapping. As shown in FIG. 1A, the transducer region 101 includes an optional electrical resistive heater 128 that is located proximal to electromagnetic writer device 105. For example, in use during lapping, the optional electrical resistance heating device 128 can be energized during lapping to cause the electromagnetic writer device 105 to selectively expand relative to the magnetoresistive reader device 110 by an by a desired amount, while the electrical resistance device 125 is not energized during lapping. In use during hard disc drive operation, the optional electrical resistance heating device 128 is not energized, but the electrical resistance device 125 can be energized to adjust the distance between the electromagnetic writer device 105 and an underlying rotating disc (not shown). One or more heat sources (e.g., electrical resistive heaters 125, 126, and 128) can be selected for each slider 111 in row bar 100 to produce a desired ratio of first expanded distance 132 to the second expanded distance 134 for a given power that is supplied to the one or more heat sources. The ratio can be the same or different among each of the sliders 111.

Figure 1F:
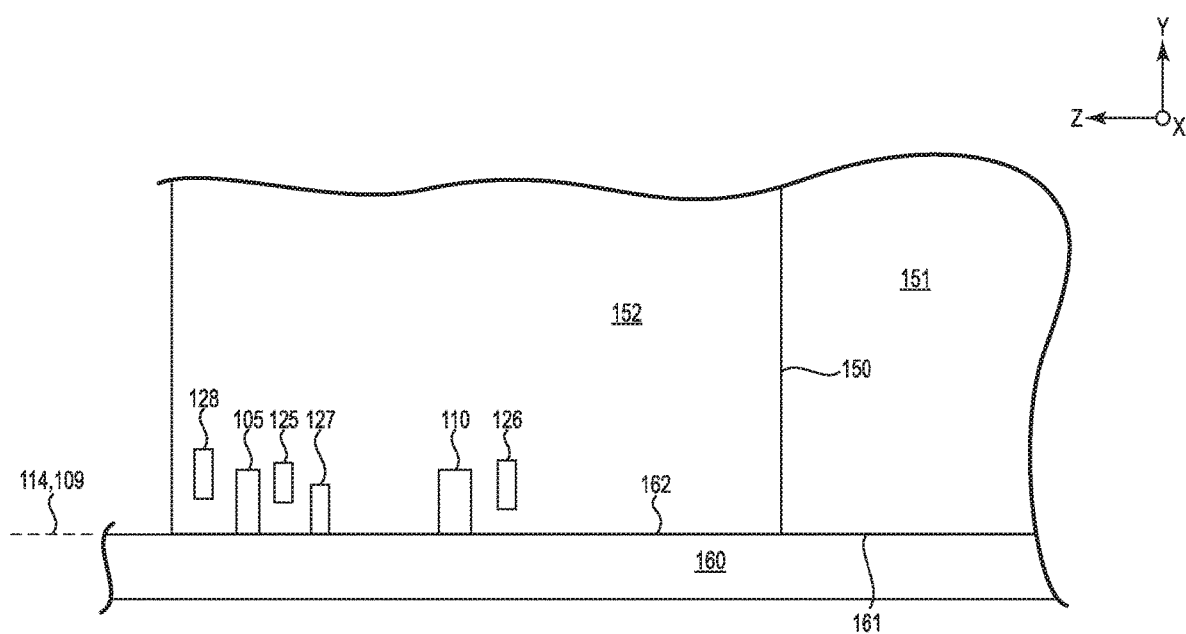
FIG. 1F shows a schematic, cross-section view of the portion of the slider shown in FIG. 1D after the slider has been lapped for a period of time.
Figure 1G:
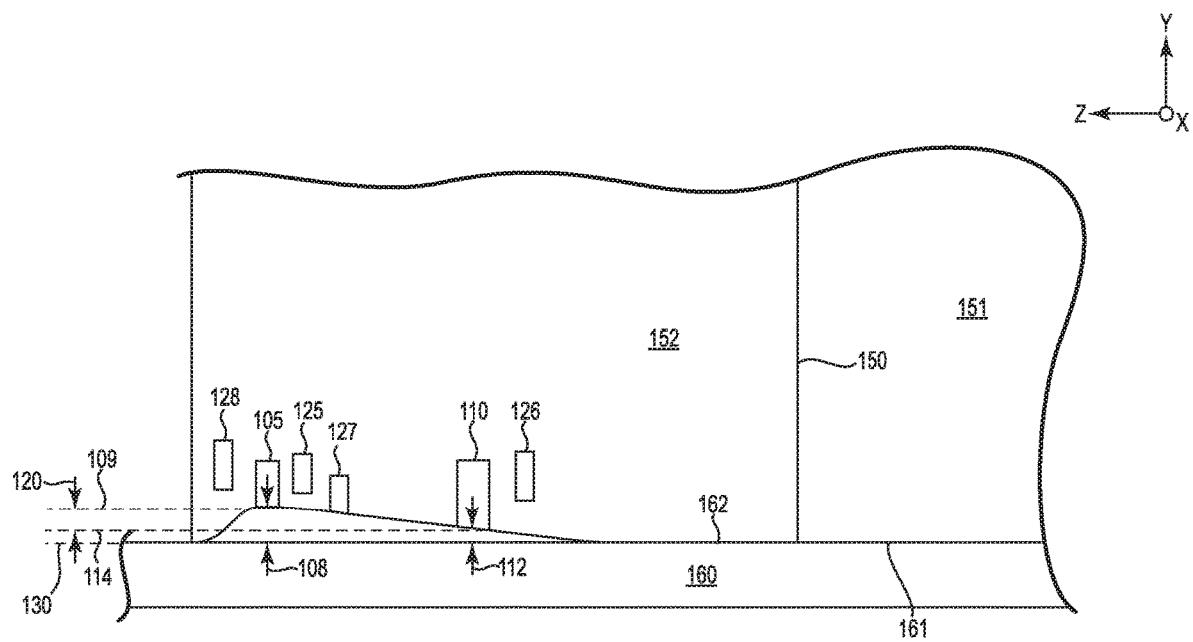
FIG. 1G shows a schematic, cross-section view of the portion of the slider after FIG. 1F when the writer electrical resistive heater 125 is no longer energized during lapping.

Referring to FIGS. 1D and 1F, while a pre-determined current is applied to a device 125 in the transducer region 101 to generate heat and cause at least the first transducer device 105 to expand in the lapping direction ("heater on") the row bar 111 can be caused to contact the rotating surface 161 of lapping plate 160 so that the expanded portion of the slider 111 can be removed. As shown in FIG. 1F, the slider 111 is "planarized" while applying the current ("heater on", "hot kiss lapping"). In some embodiments, the slider 111 can be planarized so that the air bearing surface 162 corresponds to the writer break point target position 109 of electromagnetic writer device 105 and the reader stripe height target position 114 of the magnetoresistive reader device 110. After the slider 111 has been planarized at this point in the kiss lapping process as shown in FIG. 1F, the current can be reduced for a final stage of kiss lapping. As shown in FIG. 1G, the current is stopped so that no heat is generated via heater 125 and the area 117 cools down and recedes so that electromagnetic writer device 105 and magnetoresistive reader device 110 recede in the lapping direction "y" by a distance equal to the amount of material that was removed via lapping. That is, the receded distance 108 is equal to the first expanded distance 132 and the second receded distance 112 is equal to the second expanded distance 134. As shown in FIG. 1G, the receded distance 108 is from the slider reference lapping plane 130 and is also equal to distance 108 in FIG. 1A. As also shown in FIG. 1G, the receded distance 112 is from the slider reference lapping plane 130 and is also equal to distance 112 in FIG. 1A.

Figure 1H:
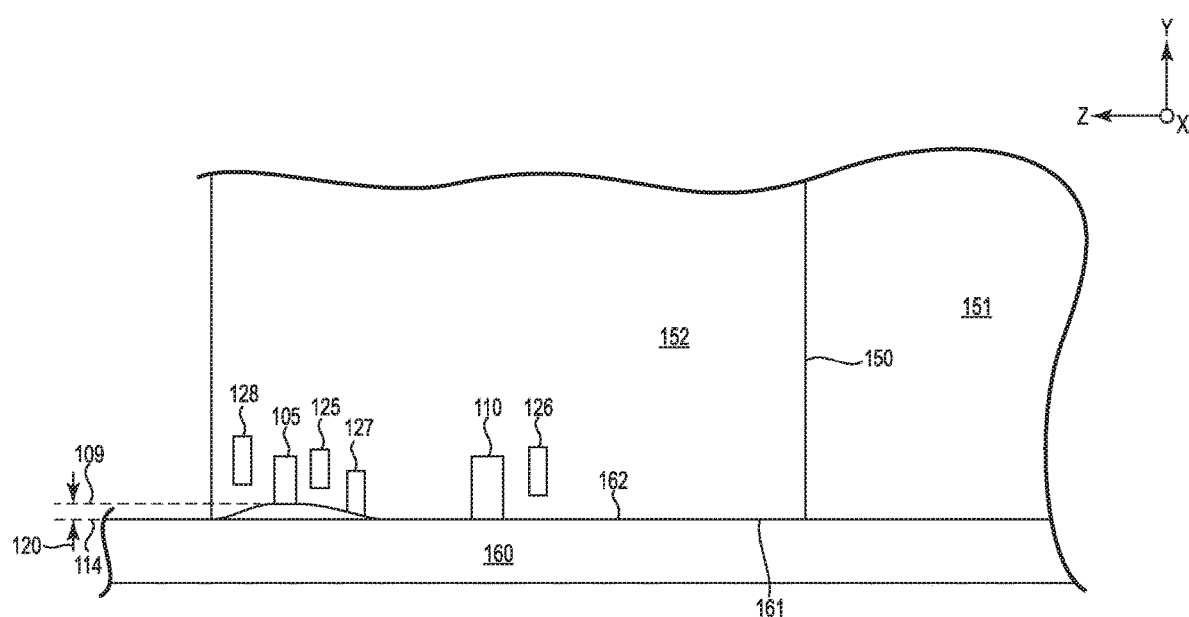
FIG. 1H shows a schematic, cross-section view of the portion of the slider after FIG. 1G when lapping is complete.

As can be seen, the reader stripe height target position 114 is receded relative to the air bearing surface 162, which can be undesirable for reasons mentioned above. According to the present disclosure, a second stage of kiss lapping can be performed to remove additional material from the slider 111 so that the reader stripe height target position 114 is relatively closer (e.g., coplanar) to the air bearing surface 162. As shown in FIG. 1H, the row bar 100 can continue to contact the rotating surface 161 of lapping plate 160 so that additional material can be removed from of the slider 111 and the slider 111 can be "planarized" as desired, while the current is reduced and the slider 111 is relatively cooler. As shown in FIG. 1G, no current is applied to device 125 in the transducer region 101 ("heater off") during this second (final, "cold lapping") stage of kiss lapping. As shown in FIG. 1H, when lapping is complete the distance between the air bearing surface 162 and the electromagnetic writer device 105 now coincides with the writer break point target position 109. Also, the reader stripe height target position 114 of the magnetoresistive reader device 110 is now coplanar with the air bearing surface 162, which can be very desirable and a significant advantage according to the present disclosure. Also, as shown in FIG. 1G, the distance between the writer break point target position 109 and the reader stripe height target position 114 is equal to delta distance 120 described above with respect to FIG. 1A. Alternatively, in some embodiments, lapping with the heater off may be completed before magnetoresistive reader device 110 is coplanar with the air bearing surface 162. In such embodiments, the reader stripe height target position 114 of the magnetoresistive reader device 110 may still be receded relative to the air bearing surface 162 but not as much as shown in FIG. 1G, which can still be desirable and a significant advantage according to the present disclosure. As yet another alternative, in some embodiments, lapping with the heater off may be completed beyond ("overshooting") reader stripe height target position 114. For example, when lapping is complete the writer break point target position 109 of the electromagnetic writer device 105 may be coplanar with the air bearing surface 162.

In some embodiments, controlling kiss lapping to writer break point target position 109 can be performed with writer electrical resistive heater 125 and controlling kiss lapping to reader stripe height target position 114 can simultaneously be performed with an actuator arm of a mounting carrier. Examples of lapping carriers are described in U.S. Pat. No. 9,776,299 (Herendeen) and U.S. Pub. No. 2015/0258655 (Koon et al.), wherein the entireties of said patent documents are incorporated herein by reference. In some embodiments, controlling lapping to writer break point target position 109 and reader stripe height target position 114 can be performed in this manner for each slider 111 of a row bar.

In some embodiments, before kiss lapping as described herein with respect to FIGS. 1A-1H, a transducer device such as electromagnetic writer device 105 can be intentionally underlapped from the writer break point target position 109. In some embodiments, one or more transducer devices can be underlapped in the lapping direction by a distance from 0.5 to 10 nanometers. This can facilitate using a heat source according to the present disclosure to cause relative expansion among transducer devices and avoid overlapping the transducer device that is underlapped.

In some embodiments, one or more electronic lapping guides (ELGs) can be used during lapping. An ELG has an electrical resistance that can change as conditions change. For example, the electrical resistance of an ELG can increase as ELG material is removed during a lapping process and thus may be used to monitor lapping of the air bearing surface 162 during slider 111 manufacturing. Accordingly, an ELG may be formed in a slider and the ELG resistance may be monitored during lapping. The resistance of an ELG can be correlated to material removed from a device that the ELG is associated with such as electromagnetic writer device 105, magnetoresistive reader device 110, and/or a near-field transducer (not shown). Thus, the ELG can be used to target a desired dimension of the electromagnetic writer device 105, the magnetoresistive reader device 110, and/or a near-field transducer. For example, an ELG can be used during lapping to target a height value for the magnetoresistive reader device 110 (e.g. reader stripe height target position 114) and another ELG can be used during lapping to target a height value for the electromagnetic writer device 105 (e.g., writer break point target position 109). ELGs are also described in U.S. Pat. Nos. 7,551,406 (Thomas et al.), 7,643,250 (Araki et al.), 8,165,709 (Rudy), 2006/0168798 (Naka), and 2010/0208391 (Gokemeijer), wherein there entireties of said patent documents are incorporated herein by reference.

As shown in FIG. 1E, slider 111 includes a writer ELG 115 and a reader ELG 116. Writer ELG 115 and reader ELG can each be located hundreds of microns away in the cross-track direction "x" from electromagnetic writer device 105 and magnetoresistive reader device 110, respectively. During lapping, if writer electrical resistive heater 125 is used as described herein to expand slider 111 in the area 117 ("heat bubble"), then the writer ELG 115 can likewise be hundreds of microns outside of area 117. If the writer ELG 115 is located outside the area 117, then the writer ELG 115 may not provide the intended metrology with respect to electromagnetic writer device 105 while electromagnetic writer device 105 is expanding as shown in FIG. 1D. In some embodiments, one or thermal sensors can be located proximal (e.g., within area 117) to a given device being expanded (e.g., electromagnetic writer device 105). Advantageously, a thermal sensor can provide desirable metrology information with respect to a device during lapping while the device is expanded due to heating. For example, a thermal sensor 127 can be located proximal to electromagnetic writer device 105 within area 117. In some embodiments, a thermal sensor can be located within 0.5 to 5 micrometers in the downtrack "z" direction of its associated magnetoresistive device. A thermal sensor can be located above the final air bearing surface in the lapping direction such that material is not removed from the thermal sensor during lapping as is the case with its associated magnetoresistive device. In some embodiments, a thermal sensor can be located above the air bearing surface in the lapping direction "y" by a distance in the range from 0.1 to 1 micrometers.

During lapping, while current is applied to writer electrical resistive heater 125 and heating area 117, the resistance of thermal sensor 127 can be measured. Temperature can be inferred from the measured resistance of thermal sensor 127. Then, the inferred temperature can be used to calculate the corresponding protrusion of electromagnetic writer device 105 from a model that correlates temperature to protrusion of electromagnetic writer device 105.

A non-limiting example of correlating temperature to protrusion of electromagnetic writer device 105 is described herein below. A thermal sensor such as sensor 127 can be a thin sheet of resistive metal that can be used determine resistance vs temperature for the thermal sensor 127 either empirically or using a look-up table. An empirical approach can include raising and/or lowering the ambient temperature and measuring the resistance change of the sensor 127 in a row bar 100 as a function of temperature. Using a look-up table can include obtaining literature values from a look-up table for resistance change vs temperature for the material(s) used in this thermal sensor 127.

Also, a model for heater current or power vs temperature can be used. This can involve electrically connecting to a heater in a slider (e.g., a reader heater, a writer heater, or a dedicated lapping heater) and electrically connecting to a thermal sensor (e.g., sensor 127) in the slider. Next, the current or power delivered to the heater can be varied and the resistance of the thermal sensor 127 measured. Finally, the heater current or power can be plotted versus the resistance of thermal sensor 127. It is noted that this calibration method can be done while not lapping, because lapping may remove material from the thermal sensor and cause resistance to change. Also, calibration can be done with a row bar in contact with a static (non-rotating) lapping plate or without a row bar in contact with a lapping plate.

One non-limiting example of a thermal sensor 127 is referred to as a dual-ended temperature coefficient of resistance sensor (DETCR). An example of a DETCR is described in U.S. Pat. No. 8,638,349 (Liu et al.), wherein the entirety of said patent document is incorporated herein by reference. Another non-limiting example of a thermal sensor 127 includes a thermal asperity detector (TAD). An example of a TAD is described in U.S. Pub. No. 2003/0065992 (Yang), wherein the entirety of said patent document is incorporated herein by reference.

Figure 2:
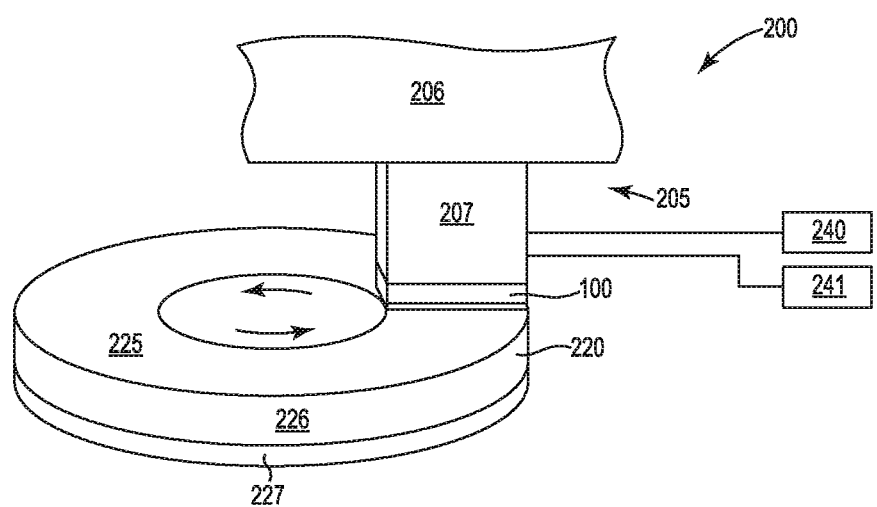
FIG. 2 is a schematic, elevation view showing portions of a lapping system according to the present disclosure for lapping a row bar of sliders.

Embodiments of the present disclosure can also include the related lapping system. A nonlimiting example of such a lapping system is illustrated in FIG. 2. FIG. 2 shows a lapping system 200 that includes a mounting structure 205 that can removably couple row bar 100. As shown in FIG. 2, the mounting structure 205 includes an arm structure 206 and a carrier 207 that is removably attached to the arm structure 206. The row bar 100 is also removably attached to the carrier 207.

Lapping system 200 also includes lapping plate 220 mounted on a rotatable plate chuck 227 so that the lapping plate 220 can rotate, e.g., in the direction indicated by the arrows. A lapping plate 220 can be mounted on chuck 227 in any desirable manner. Examples include: using locating pins on chuck 227 and associated recesses in lapping plate 220; relying on the weight of plate 220 to hold it in place on chuck; clamps; vacuum; combinations of these and the like.

Lapping plate 220 has a lapping surface 225 that is operable to rotate and contact the row bar 210 for lapping each slider 211.

A lapping plate can be made of a wide variety of materials. In some embodiments, a lapping plate can be made of one or more metallic alloys, which can provide mechanical strength to help provide desirable flatness and prevent deformation. While surface 225 can be an abrasive surface made of abrasive particles and a coating material to adhere the abrasive particle to the lapping plate 220, at least the bulk of the lapping plate 220 can be made of a material that has a relatively high thermal conductivity so as to facilitate transfer heat to or from the temperature control system described below.

An abrasive coating can be provided on a lapping plate 220 to form lapping surface 225. An abrasive coating can include a plurality of abrasive particles such as diamond particles, cubic boron nitride particles, alumina particles, alumina zirconia particles, silicon carbide particles, and combinations thereof.

Lapping plate 220 can have a wide variety of diameters and thicknesses. In some embodiments, lapping plate 220 can have an outer diameter in the range from 10 to 20 inches. In some embodiments, lapping plate 220 can have a thickness in the range from 0.5 to 5 inches.

As shown in FIG. 2, apparatus 200 can include a controller 240 for executing lapping program instructions, and a source 241 of electrical current that is electrically coupled to the row bar 100 to generate heat and the controller 241 for executing related program instructions.

In some embodiments, the temperature of a row bar 111 can unintentionally fluctuate due to one or more factors such as frictional heating due to lapping, or the temperature of the surrounding environment. Such fluctuations may cause the devices that are heated to expand (e.g., the electromagnetic writer device 105 and the magnetoresistive reader device 110) more or less than intended. Also, such fluctuations in temperature can increase or decrease the resistance detected in an ELG, which can indicate an incorrect amount of material that is lapped away from the ELG and corresponding device. A lapping plate having a temperature control system can help control the temperature of the row bar in physical contact with the lapping place so as to reduce or substantially eliminate such temperature fluctuations. An example of such a temperature control system is described in patent application titled "A LAPPING SYSTEM THAT INCLUDES A LAPPING PLATE TEMPERATURE CONTROL SYSTEM, AND RELATED METHODS" by Habermas et al., having Ser. No. 62/686,417 and filing date Jun. 18, 2018, wherein the entirety of said patent application is incorporated herein by reference.

In order to electronically access slider devices (e.g., electromagnetic writer device 105, etc.), a slider can include a plurality of electrical contact pads that may be electrically connected to the slider devices. FIG. 2 is a schematic that shows the trailing edge face 157 of slider 111. The contact pads illustrated are present on the trailing edge face. FIG. 2 also includes an electrical wiring diagram showing how the contact pads are electrically connected to devices such as ELGs, writer heater, DETCR, and the like. As shown in FIG. 2, slider 111 includes a first row 205 of electrical contact pads along the cross track axis "x" and a second row 220 of electrical contact pads along the cross track axis "x". The first row 205 of contact pads includes a ground contact pad 208 and can be electrically connected to features used during head-gimbal assembly (HGA) operation in a hard disk drive (HDD). The second row 220 of electrical contact pads can be dedicated for use of features used during lapping according to the present disclosure. That way, electrical connections can be made to the second row 220 of electrical contact pads and then after lapping is done, the second row 220 of electrical contact pads can just be left unused, thereby leaving the first row 205 of electrical contact pads in relatively good condition. For example, the first row 205 of electrical contact pads can avoid having undue scratching or any remnants of wire bonds from the lapping process.

In more detail, with reference to the slider 111 illustrated in FIGS. 1A-1G, electrical contact pads 206 and 207 can be electrically connected to electromagnetic writer device 105 and electrical contact pads 211 and 212 can be electrically connected to magnetoresistive reader device 110. Reader electrical resistive heater 126 can be electrically connected to electrical contact pad 213.

With respect to the slider 111 devices used during lapping as described herein, writer ELG 115 can be electrically connected to electrical contact pads 222 and 223 and reader ELG 116 can be electrically connected to electrical contact pads 221 and 222. Advantageously, writer ELG 115 and reader ELG 116 can share a common electrical contact pad 222 to save space in the second row 220 of electrical contact pads.

Also, thermal sensor 127 (e.g., DETCR) can be electrically connected to electrical contact pads 225 and 226 in the second row 220, which can be electrically connected to electrical contact pads 209 and 210, respectively, in the first row 205. Finally, writer electrical resistive heater 125 can be electrically connected to electrical contact pad 224 in the second row 220 and electrical contact pad 214 in the first row 205. This way, electrical connections can be made to electrical contact pads in the second row 220 for lapping purposes, thereby avoiding undue scratching and/or remnants of wire bonds on electrical contact pads in the first row 205.

Electrical contact pads can be made out a variety of conductive materials such as gold and the like. Devices can be electrically connected to contact pads via bonding, soldering, or other electrical connection. For example, gold wire can be used to electrically connect a contact pad to a device.

What is claimed is:

1. A method of lapping a row bar having a plurality of sliders, wherein the method comprises:
   a) providing the row bar having a plurality of sliders, wherein at least one slider comprises a transducer region comprising: at least a first transducer device and a second transducer device;
   b) heating the transducer region to cause at least the first transducer device and the second transducer device to expand in the lapping direction toward a lapping plate, wherein the first transducer device expands in the lapping direction toward the lapping plate by an amount greater than the second transducer device expands in the lapping direction toward the lapping plate;
   c) lapping the row bar while heating the transducer region;
   d) reducing the heating so that the first transducer device cools and recedes to a first receded distance in the lapping direction away from the lapping plate and the second transducer device cools and recedes to a second receded distance in the lapping direction away from the lapping plate, wherein the first transducer device recedes by an amount greater than the second transducer device; and
   e) lapping the row bar while the heating is reduced at least until the first transducer device is at a third receded distance in the lapping direction away from the lapping plate and the second transducer device is at a fourth receded distance in the lapping direction away from the lapping plate, wherein the fourth receded distance is less than the second receded distance.

2. A method of lapping a row bar having a plurality of sliders, wherein the method comprises:
   a) providing the row bar having a plurality of sliders, wherein at least one slider comprises a transducer region comprising: at least a first transducer device, a second transducer device, and one or more heat-generating devices;
   b) applying a current to the one or more heat-generating devices in the transducer region to generate heat and cause at least the first transducer device and the second transducer device to expand in the lapping direction toward a lapping plate, wherein the current is controlled to cause the first transducer device to expand in the lapping direction toward the lapping plate by an amount greater than the second transducer device expands in the lapping direction toward the lapping plate;
   c) lapping the row bar while applying the current to the one or more heat-generating devices;
   d) reducing the current applied to the one or more heat-generating devices while lapping the row bar so that the first transducer device cools and recedes to a first receded distance in the lapping direction away from the lapping plate and the second transducer device cools and recedes to a second receded distance in the lapping direction away from the lapping plate, wherein the first transducer device recedes by an amount greater than the second transducer device; and
   e) lapping the row bar while the current is reduced at least until the first transducer device is at a third receded distance in the lapping direction away from the lapping plate and the second transducer device is at a fourth receded distance in the lapping direction away from the lapping plate, wherein the fourth receded distance is less than the second receded distance.

3. The method of claim 2, wherein lapping the row bar while applying the current to the one or more heat-generating devices is performed at least until the row bar is planarized.

4. The method of claim 2, wherein reducing the current applied to the one or more heat-generating devices while lapping the row bar comprises reducing the current while lapping the row bar to zero.

5. The method of claim 2, wherein the first transducer device expands in the lapping direction toward the lapping plate by a first expanded distance from a first slider planar, reference lapping plane and the second transducer device expands in the lapping direction toward the lapping plate by a second expanded distance from the first slider planar, reference lapping plane, wherein the ratio of the first expanded distance to the second expanded distance is greater than or equal to one.

6. The method of claim 5, wherein the first receded distance 108 is from the first slider planar, reference lapping plane, wherein the second receded distance is from the first slider planar, reference lapping plane, and wherein the first receded distance is equal to the first expanded distance and the second receded distance is equal to the second expanded distance.

7. The method of claim 6, wherein the third receded distance is from a second slider planar, reference lapping plane, wherein the fourth receded distance is from the second slider planar, reference lapping plane, wherein the fourth receded distance is zero.

8. The method of claim 2, wherein the first transducer device provided in (a) has a first feature that has a first target distance between a first slider planar, reference lapping plane and a first target value in the lapping direction and the second transducer device provided in (a) has a second feature that has a second target distance between the first slider planar, reference lapping plane and a second target value in the lapping direction, wherein the first target distance is greater than the second target distance.

9. The method of claim 8, wherein the first transducer device expands in the lapping direction toward the lapping plate by a first expanded distance from the first slider planar, reference lapping plane and the second transducer device expands in the lapping direction toward the lapping plate by a second expanded distance from the first slider planar, reference lapping plane, wherein the first target distance is equal to the first expanded distance, and the second target distance is equal to the second expanded distance.

10. The method of claim 8, wherein lapping the row bar while applying the current to the one or more heat-generating devices is performed at least until first and second target values are reached.

11. The method of claim 2, wherein the first transducer device comprises an electromagnetic device and the second transducer device comprises a magnetoresistive device.

12. The method of claim 11, wherein the electromagnetic device comprises a electromagnetic writer device and the magnetoresistive device comprises a magnetoresistive reader device.

13. The method of claim 2, wherein the one or more heat-generating devices are chosen from a magnetoresistive reader device, magnetoresistive reader heating device, a electromagnetic writer device, electromagnetic writer heating device writer heater, a near field transducer, a lapping-only heating device, and combinations thereof.

14. A lapping system comprising:
  a) a mounting structure that can removably couple a row bar, wherein the row bar comprises a plurality sliders, wherein at least one slider to be lapped comprises a transducer region comprising: at least a first transducer device, a second transducer device, and one or more heat-generating devices;
  b) a lapping plate having a lapping surface that is operable to rotate and contact the row bar to remove material from the row bar while the lapping plate rotates and contacts the row bar; and
  c) a controller comprising program instructions comprising:
    i) apply a current to the one or more heat-generating devices in the transducer region to generate heat and cause at least the first transducer device and the second transducer device to expand in the lapping direction toward the lapping plate, wherein the current is controlled to cause the first transducer device to expand in the lapping direction toward the lapping plate by an amount greater than the second transducer device expands in the lapping direction toward the lapping plate;
    ii) lap the row bar while applying the current to the one or more heat-generating devices;
    iii) reduce the current applied to the one or more heat-generating devices so that the first transducer device cools and recedes to a first receded distance in the lapping direction away from the lapping plate and the second transducer device cools and recedes to a second receded distance in the lapping direction away from the lapping plate, wherein the first transducer device recedes by an amount greater than the second transducer device; and
    iv) lap the row bar while the current is reduced at least until the first transducer device is at a third receded distance in the lapping direction away from the lapping plate and the second transducer device is at a fourth receded distance in the lapping direction away from the lapping plate, wherein the fourth receded distance is less than the second receded distance; and
  d) a source of electrical current, where the source is electrically coupled to the row bar and the controller.

15. The system of claim 14, wherein the first transducer device in the at least one slider to be lapped has a first feature that has a first target distance between a first slider planar, reference lapping plane and a first target value in the lapping direction and the second transducer device provided in the at least one slider to be lapped has a second feature that has a second target distance between the first slider planar, reference lapping plane and a second target value in the lapping direction, wherein the first target distance is greater than the second target distance.

* * * * *